US008060727B2

(12) United States Patent
Blixt (10) Patent No.: US 8,060,727 B2
(45) Date of Patent: Nov. 15, 2011

(54) MICROPROGRAMMED PROCESSOR HAVING MUTIPLE PROCESSOR CORES USING TIME-SHARED ACCESS TO A MICROPROGRAM CONTROL STORE

(75) Inventor: Stefan Blixt, Balsta (SE)

(73) Assignees: Conemtech AB, Kista (SE); IMSYS AB, Upplands Vasby (SE)

( * ) Notice: Subject to any disclaimer, the term of this patent is extended or adjusted under 35 U.S.C. 154(b) by 335 days.

(21) Appl. No.: 12/143,075

(22) Filed: Jun. 20, 2008

(65) Prior Publication Data

US 2008/0320280 A1 Dec. 25, 2008

Related U.S. Application Data

(60) Provisional application No. 60/945,366, filed on Jun. 21, 2007.

(51) Int. Cl.
*G06F 9/312* (2006.01)
*G06F 15/80* (2006.01)
(52) U.S. Cl. .............. 712/32; 712/34; 712/205
(58) Field of Classification Search .......... 712/205, 712/32, 34
See application file for complete search history.

(56) References Cited

U.S. PATENT DOCUMENTS

| 3,631,405 | A | * | 12/1971 | Hoff et al. ............... 712/209 |
| 4,354,227 | A | | 10/1982 | Hays, Jr. et al. |
| 5,428,810 | A | | 6/1995 | Barkans et al. |
| 5,611,075 | A | * | 3/1997 | Garde .................... 711/153 |
| 5,893,157 | A | * | 4/1999 | Greenspan et al. ........ 711/150 |
| 2004/0202319 | A1 | * | 10/2004 | Hussain et al. .............. 380/33 |
| 2005/0256920 | A1 | * | 11/2005 | Crispin et al. ............. 708/491 |
| 2006/0080523 | A1 | * | 4/2006 | Cepulis .................. 713/100 |

FOREIGN PATENT DOCUMENTS

EP 0 249 720 12/1987

OTHER PUBLICATIONS

Extended European Search Report, dated Sep. 8, 2008 and issued in corresponding European Patent Application No. 08158063.1-1243.

* cited by examiner

*Primary Examiner* — Daniel Pan
(74) *Attorney, Agent, or Firm* — Young & Thompson (57) ABSTRACT

There is provided a novel microprogrammed processor (100) by combining two or more processor cores (10) in such a way that the processor cores can share the special microprogram memory resource (20) that is located deep inside the processor architecture. In other words, the novel microprogrammed processor (100) basically includes at least two processor cores (10), and a common internal microprogram control store (20) including microcode instructions for controlling at least the internal standard operation of the multiple processor cores, and suitable elements (30) for providing time-shared access to the microprogram control store by the processor cores.

12 Claims, 6 Drawing Sheets

MICROPROGRAMMED PROCESSOR HAVING MUTIPLE PROCESSOR CORES USING TIME-SHARED ACCESS TO A MICROPROGRAM CONTROL STORE

TECHNICAL FIELD

The invention generally relates to a microprogrammed processor, a computer system comprising such a processor as well as a method of operating a microprogrammed processor.

BACKGROUND

In general, a processor executes a program. A program includes instructions, which are stored as a sequence of bytes in a memory. An instruction, also called a machine instruction or macroinstruction, can (in the general case) consist of one or several bytes, and contains an opcode field defining its basic function, e.g. an arithmetic operation or a conditional jump in the execution sequence (instead of continuing to the next instruction). The instruction may contain other fields that may specify one or more operands. The program (sequence of instructions in the memory) has usually been produced, beforehand, by a compiler or assembler—a tool that itself is a program, which takes the programmer's source code text as input.

A processor may be built as an integrated circuit, which is then called a microprocessor.

Normally other devices can be connected to the processor and exchange data with it. These are called peripherals. Some can contain electromechanics (e.g. a printer or hard disk), but some can be purely electronic. They all have digital control electronics for interfacing with the processor, and usually also for their internal control.

It is very common to add memory and peripheral electronics on the same IC chip as the processor, in order to reduce the parts count in an embedded system (a digitally controlled device that is not a PC or server computer). The IC is then called a microcontroller, and the processor part of it is called the processor core.

In general, a processor core is a digital device that can perform different sets of actions for each cycle of a high-frequency clock signal. The processor core typically includes two main parts, or units. One is the execution unit, where data can be taken in (from memory or peripherals), operated on, temporarily stored in registers, and/or output (to memory or peripherals). The other part is the control unit, which, for every cycle of the clock, controls the actions of the execution unit and itself, based on the state reached in the previous cycle.

The control signals created by the control unit can be generated by digital gates that sense the contents of the instruction register, the sequence counter (assuming the processor has multi-cycle instructions), and other registers and flip-flops that define the machine state in the current clock cycle.

An alternative used in more complex processors is to generate the control signals from microcode words (also referred to as microinstructions). These can be thought of as words consisting of bits or bit fields, each representing control signals as defined by their positions in the word, and each word specifying the respective signal levels to be produced during the current clock cycle. The technique is similar to that used in jacquard looms, player pianos, and pegged drum controllers for old washing machines or music boxes (also used in clock chiming mechanisms from the 14th century). Each microinstruction corresponds to a line of holes in the paper roll for a player piano, and all the lines of holes on the paper roll together correspond to a micro program stored in a control store, or micro program memory. This special (wide and fast) memory, internal to the control unit of the processor core, outputs a microinstruction for every clock cycle. A difference from the player piano is that the microinstruction sequence can contain jumps, i.e. control does not always pass from one microinstruction to the next one in the stored sequence. The processor core has the control logic needed to execute the microinstructions, e.g. to generate the direct control signals to select sources of data, select operation of the arithmetic unit, select destinations for data, increment/decrement counters, and select or calculate the next microprogram address.

This means that there is an additional level of control, between the program and the executing hardware. This level usually treats the instructions of the program as data, which it, under microprogram control, brings into the execution unit and operates on. The execution unit then also comprises a resource for calculating the next microprogram address. In the beginning of the execution of a program instruction, the microcode normally analyzes the operation code of the instruction and creates a microprogram address to the start of the execution microcode sequence for that opcode. It then computes the next microprogram address using a counter for stepping ahead in the sequence and typically a multiplexor to select other alternatives, i.e. doing jumps in the microprogram.

Since the execution of a microinstruction produces (among other results) the address of the next microinstruction, a hardware loop is created, in which there must be at least one register (otherwise there would be a "combinatorial loop", which results in uncontrolled behavior). Preferably that requirement is fulfilled by a microinstruction register, which stores the microinstruction, i.e. the output from the control store.

The microprogram is normally contained in a special microprogram memory, referred to as the control store, in the control unit of the processor core (and not in the main memory where the application program is stored). The microprogram controls the details of the processor core as it controls the execution hardware to first fetch a machine instruction from the application program in the main memory and then execute this instruction by performing arithmetic/logic or other operations and determining the next program address, as specified by the microprogram.

Although microprogrammed processors represent a significant advance in processor technology, especially by allowing higher complexity of operation and thereby increased overall flexibility and efficiency, there is still a general demand, especially in embedded systems, for processors that are even more efficient, e.g. with lower cost and lower power consumption, through higher program density, more efficient use of hardware resources, and/or higher flexibility for different kinds of special operations.

SUMMARY

It is a general object of the invention to provide an improved microprogrammed processor and related computer system.

It is also an object of the invention to provide an improved method of operating a microprogrammed processor.

These and other objects are met by the invention as defined by the accompanying patent claims.

A basic idea of the present invention is to provide a novel microprogrammed processor by combining two or more processor cores in such a way that the processor cores can share the special microprogram memory resource that is located deep inside the processor architecture.

In other words, the novel microprogrammed processor basically comprises at least two processor cores, and a common internal microprogram control store including microcode instructions for controlling at least the internal standard operation of the multiple processor cores, and suitable means for providing time-shared access to the microprogram control store by the processor cores.

In a specific exemplary embodiment, execution units of the multiple processor cores and the common microprogram control store are provided on the same integrated circuit (IC) chip, effectively providing a truly unique microprogrammed multi-core microprocessor using a common/shared microprogram control store.

Other advantages offered by the invention will be appreciated when reading the below description of embodiments of the invention.

BRIEF DESCRIPTION OF DRAWINGS

The invention, together with further objects and advantages thereof, will be best understood by reference to the following description taken together with the accompanying drawings, in which.

DETAILED DESCRIPTION

Throughout the drawings, the same reference characters will be used for corresponding or similar elements.

Figure 1:
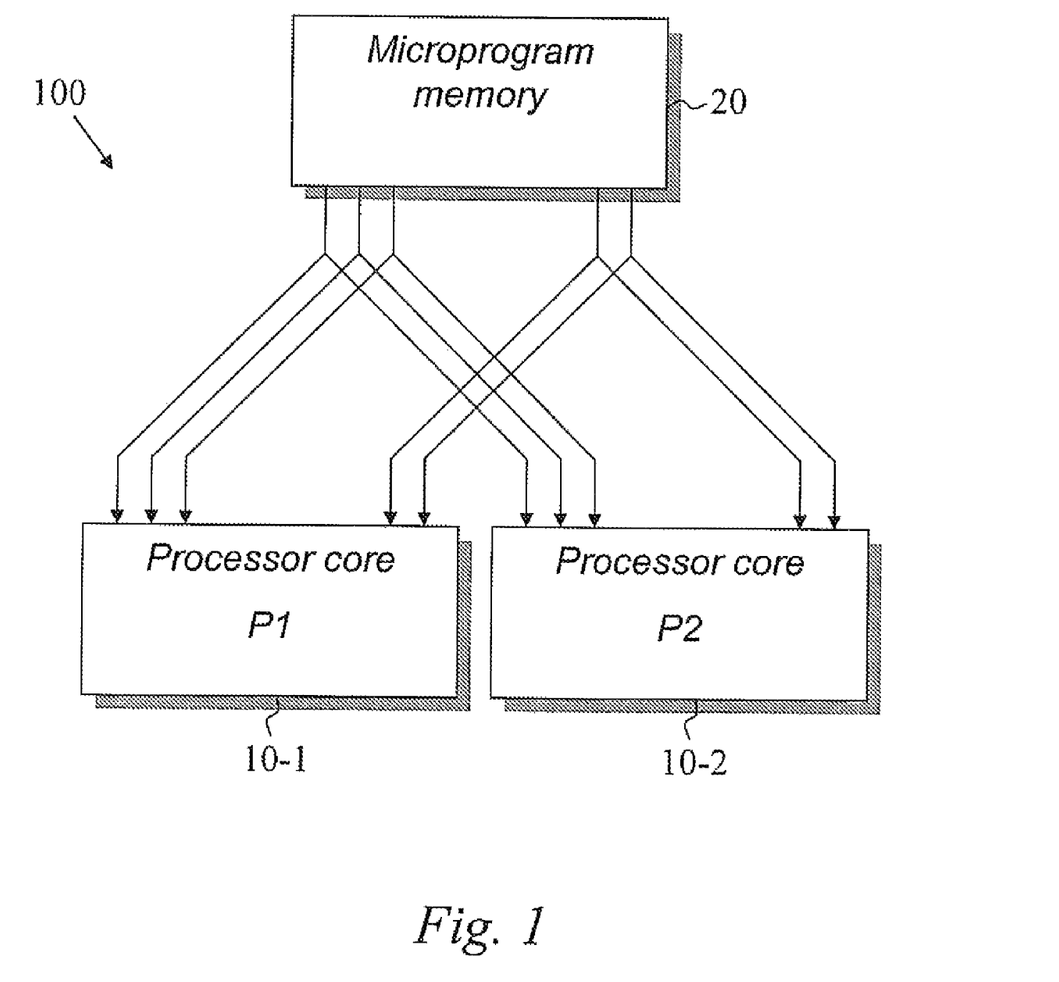
FIG. 1 is a schematic diagram illustrating the basic schematics of a novel processor architecture according to an exemplary embodiment of the invention.

As schematically illustrated in FIG. 1, the invention relates to a microprogrammed processor 100, preferably also built as a microprocessor, having two or more processor cores (P1, P2) 10-1, 10-2. Each of the cores has an execution unit (i.e. resources or sets of resources such as arithmetic/logic units and associated registers) and a microprogram-controlled control unit, but instead of having their own microprogram memories the control units of the cores time-share a common microprogram memory 20, also referred to as the control store.

The control store may for example be a RAM core or ROM core or a programmable ROM core such as flash memory, or any combination of these (two or more memory cores, each covering a part of the address range), comprising microinstructions for the control of the execution units. In a preferred exemplary embodiment, the execution units and memory cores are preferably all on the same integrated circuit chip to provide a microprogrammed multi-core processor in microprocessor implementation.

Microprogramming, i.e. the use of an internal control store with microinstructions controlling the internal operation of a processor, can be useful in embedded systems having their software based on "virtual machines" and/or using demanding algorithms that do not execute efficiently on common standard processors, i.e. simple microcontrollers, RISC (Reduced Instruction Set Computer) processors, or DSP (Digital Signal Processor) processors. Microprogramming is used in traditional CISC (Complex Instruction Set Computer) processors, but those normally have a limited traditional instruction set, "frozen" for further development due to the backwards software compatibility requirements, and these microprograms are normally small and stored in ROM. The instruction sets of CISC machines are usually old and not well suited for modern compilers.

However, microprogramming can be used for other instruction sets, such as the "byte code" of the Java Virtual Machine. This was designed to fit a compiler. Other virtual machines have also been defined, and such "virtualization" is of increasing importance.

Microprogramming can also be used for increasing the efficiency (increasing speed and/or reducing power consumption) of the execution of important algorithms, such as cryptography, graphics, audio and video processing, radio baseband processing, data compression/decompression, and Java garbage collection.

In general, a microcode-programmed (i.e. a microprogrammed) processor is a processor in which the general standard operation of the processor is controlled by sequences of microcode words in the internal micro program memory (i.e. the control store). This should not be confused with the expression "microprocessor", which simply means that the processor is built as an integrated circuit. Naturally, a microcode-programmed processor may also be built as an integrated circuit, but a microprocessor is not by definition equipped with a micro program for controlling its internal operation.

There are processors with execution units optimized for signal processing, for graphics, or for Java, but these optimizations are different for the different purposes and difficult to combine in an economic design. The use of microprogramming can make possible a processor design with sufficient performance on all these different types of processing, using relatively simple general-purpose execution units without adding special optimization hardware.

Such a design will need a larger control store than that of a typical CISC. The execution unit can often be simpler, because of the high speed of modern IC technology, the characteristics of performance requirement for embedded systems as compared to computers ("good enough" instead of "as fast as possible"), and the increased "intelligence" offered by sophisticated microprogrammed control.

Requirements can be tough also in embedded systems— there are often, for example, response-time requirements that would be difficult for a much more expensive computer. Thus, there are many embedded systems that contain more than one processor core, sometimes on the same silicon chip.

The execution unit(s) of a processor core may be built from combinatorial logic gates, flip-flops, and perhaps a register set in some kind of RAM core. In a preferred exemplary embodiment of the invention the operation of the unit is controlled by a microprogram in a similar (but often larger) on-chip memory, the microprogram memory (i.e. control store), which e.g. can be of read/write type (RAM) or read-only (ROM) or a combination of both.

Often two-port RAM is used for register sets, but such memory cores are twice as large as simple one-port RAM. In a less expensive unit with one-port RAM the cycle time may need to be longer to allow for both read and write. But if the combinatorial logic should be truly general-purpose, e.g. contain a hardware multiplier as in a DSP—and not speed-optimized for the ALU (Arithmetic Logic Unit) as in a RISC—then that may be acceptable.

In a preferred exemplary embodiment of this invention, the longest path delays through the combinatorial logic are about twice as long as the minimum cycle time of the internal memory cores. Preferably, the microinstruction cycle is divided in two halves and the logic can do one read plus one write access, in sequence, in the internal memory cores during one microinstruction cycle.

The microprogram memory is a relatively expensive resource. As mentioned, a basic idea of the invention is to combine two (or more) processor cores, exemplified by P1 and P2 in FIG. 1, in such a way that the execution units of the cores can share this resource.

Figure 2:
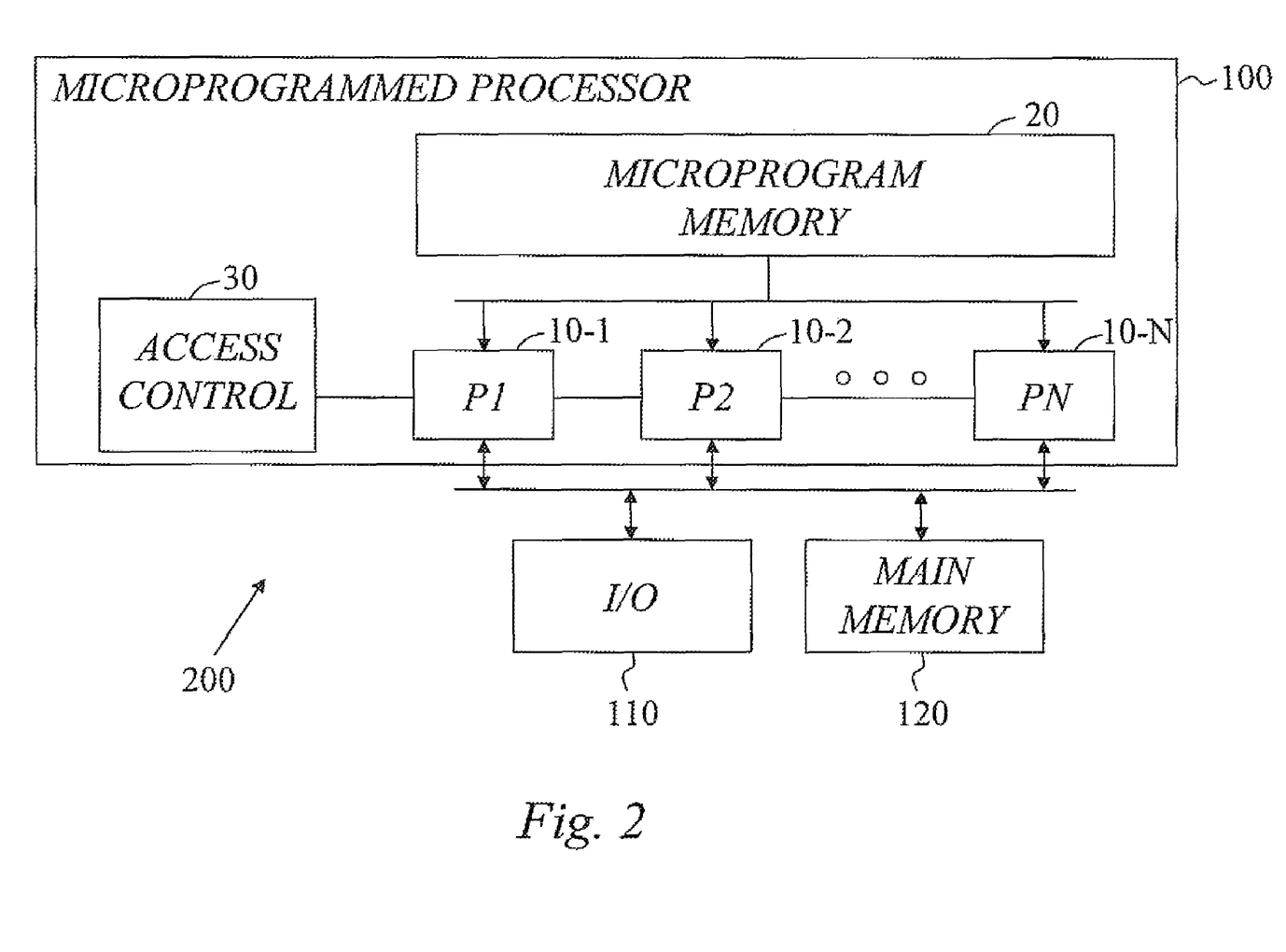
FIG. 2 is a schematic diagram illustrating a computer system based on a microprogrammed multi-core processor using a shared control store according to a preferred exemplary embodiment of the invention.

FIG. 2 is a schematic diagram illustrating a computer system based on a microprogrammed multi-core processor using a shared control store according to a preferred exemplary embodiment of the invention. The computer system 200 basically comprises a microprogrammed processor 100, and input/output (I/O) unit 110 and a main memory 120. The microprogrammed processor 100 includes a number, N, of processor cores 10-1, 10-2, . . . , 10-N, also denoted P1 to PN, an internal common microprogram memory 20 and a time-shared access control unit 30 for generating suitable control signals for controlling access to the microprogram memory 20. The number, N, of processor cores is generally an integer equal to or greater than 2. The common internal microprogram memory 20, i.e. the control store, includes microcode instructions (arranged as one or more micro programs) for controlling at least the internal standard operation of the processor cores. In this example, the time-shared access control unit 30 is configured for providing time-shared access to the microprogram control store 20 by all or a subset of the processor cores.

Normally, each of the processor cores has at least one internal execution unit for executing microcode instructions from the common microprogram control store, and the execution units thus effectively share the common microprogram control store.

Preferably, the clocks for the two or more processor cores are generated such that their microinstruction cycles are out of phase. For the example with two processor cores, each one of them preferably starts its microinstruction cycle when the other core is halfway through its cycle. The clock frequency is then generally equal to (or not much longer than) twice the minimum allowable cycle time for the memory cores used in the microprogram memory, and this memory is accessed at twice the microprogram frequency. There is usually no need for writing in the microprogram memory during normal operation; only one access is needed per microinstruction.

Figure 3:
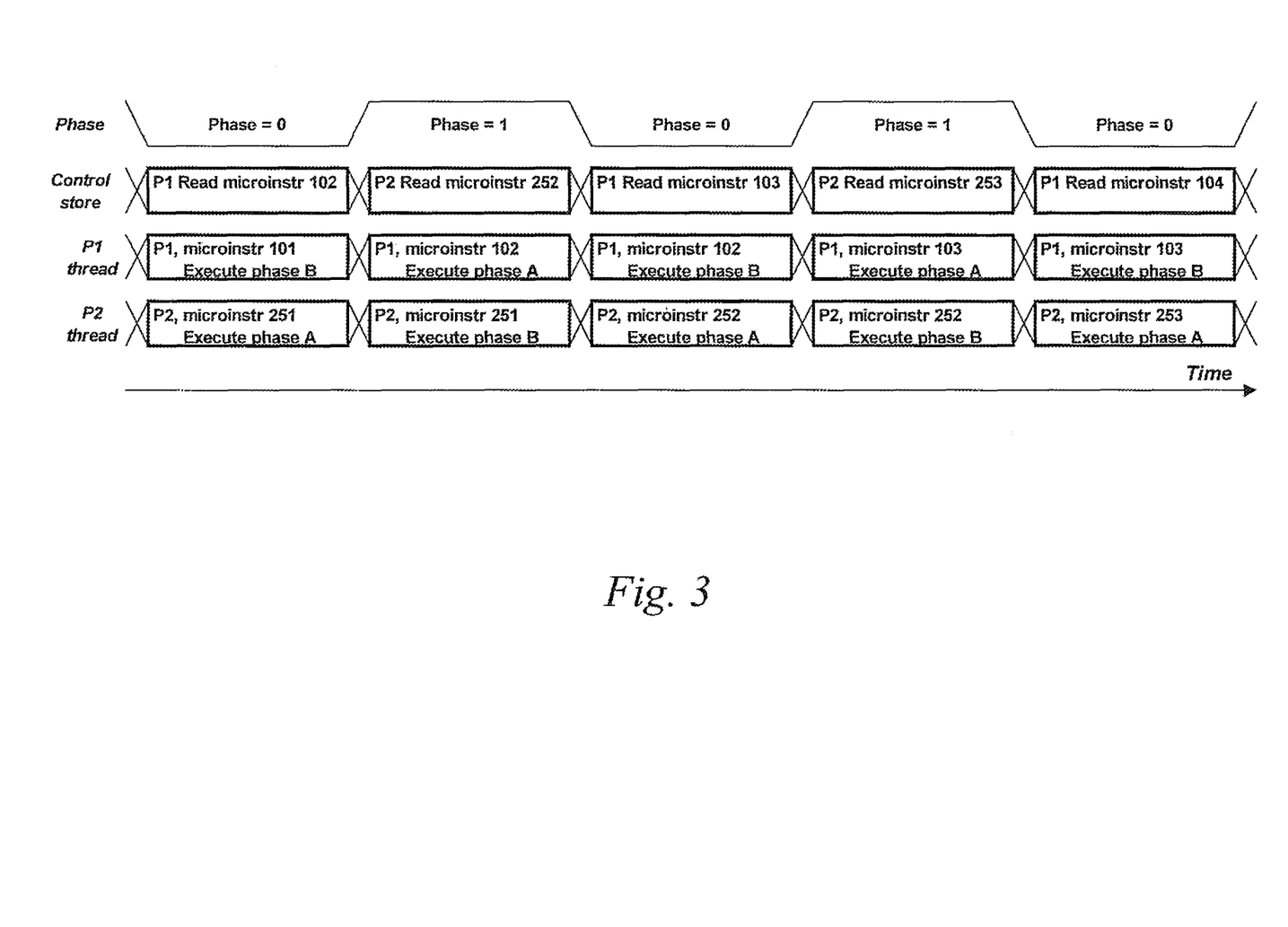
FIG. 3 is a schematic diagram illustrating an example of how the microprogram control store is switched between two processor cores.

In FIG. 3, the first line shows an example of how the microprogram memory is switched between two processor cores P1 and P2. The two lines below show the microinstruction execution in P1 and P2 at the same time. Normally, one of the processor cores reads a micro instruction, which is then executed while the other processor core reads its next micro instruction.

The time-sharing of the control store is done on a regular basis, there is normally no competition, no request/acknowl-edge signaling, no arbitration. The execution units will normally not need to wait for each other and they could be used for completely independent tasks.

This means that it is possible to have multiple processor cores that may access micro code instructions from the internal microprogram memory (i.e. control store) on a time-shared basis, and execute microcode independently of each other. Each core reads a microcode instruction from the microprogram memory and then executes the microcode instruction. While one processor core executes a microcode instruction, another processor core may access the microprogram memory and read another microcode instruction. The separate processor cores may thus execute completely different microprogram tasks, even different microprograms, independently of each other. It should be emphasized that this is not about sharing a primary memory between processors, but rather a special way of sharing the control store resource of the control unit of a micro-programmed processor having multiple cores.

If, however, the control store has a writable memory, then one of the cores/execution units is, in a preferred exemplary embodiment, stopped/put on hold and its control store cycle time slots used for writing in the control store, using the other core/execution unit.

In a preferred exemplary embodiment, the reading from the control store takes one clock cycle. The address is applied at the beginning of the cycle and the corresponding microinstruction word is loaded into the above-mentioned register, the microinstruction register, at the end of the same cycle. After this, as an example, the execution of the microinstruction requires at least two clock cycles, during which time the contents of the microinstruction register is unchanged and available to the execution unit, which it directly controls: the control signals inside the execution unit are derived from the microinstruction bits and the phase, i.e. a signal indicating whether the cycle is the first or the second execution cycle. The execution may require additional cycles, but the execution unit must then store parts of the microinstruction or derived signals, since the microinstruction register will be loaded with the next microinstruction. Furthermore, in this case the execution unit must be able to handle overlapping microinstructions—the third phase must be executed simultaneously with the first phase of the next microinstruction.

Figure 4:
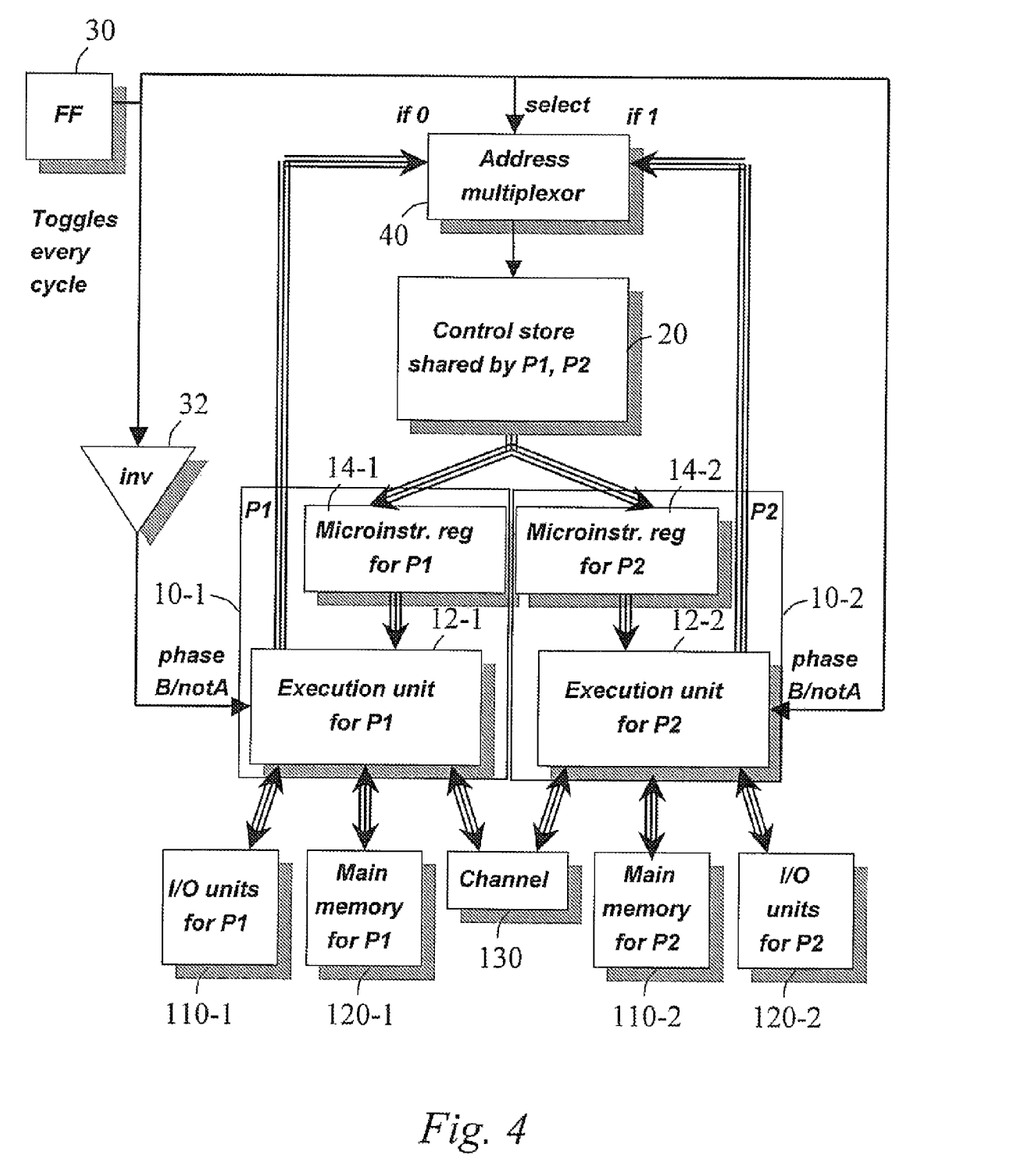
FIG. 4 is a schematic diagram illustrating a computer system based on a microprogrammed multi-core processor using a shared control store according to a preferred exemplary embodiment of the invention.

FIG. 4 illustrates an example of a preferred implementation of the invention. Basically, the computer system includes two (or more) processor cores 10-1, 10-2 (P1 and P2), a common control store 20 shared by P1 and P2, flip-flop circuitry 30 (FF) and an associated inverter 32, an address multiplexor 40, and I/O units 110 as well as main memory 120 for the processor cores, and an optional common channel unit 130. In this example, it is explicitly indicated that each processor core 10 has its own micro instruction register 14, and naturally also its own execution unit(s) 12. In this particular example, each processor core 10 is connected to its own dedicated I/O unit(s) 110 and main memory 120. Double-lines generally indicate parallel signals.

P1 and P2 are not necessarily identical, although a compatible design can provide more benefit, if it means that they can share significant portions of the microprogram. If they have different types of work, e.g. P1 is mostly free and can respond quickly to external events by executing short but time-critical sequences, while P2 executes the big and complex but less time-critical work, perhaps a Java Virtual Machine, requiring a lengthy "garbage collection" routine that must not be disturbed, then P1 may have just a small main memory and all the I/O interfaces, while P2 has a big main memory containing most of the program code and data set.

Preferably, the parts are able to exchange data. In FIG. 4, an optional "Channel" block has been included. This channel is an I/O unit for both P1 and P2. If the execution units of P1 and P2 contain DMA (direct memory access) logic, then the Channel can be very simple. It may have a register for data from P1 to P2. It will generate a "request" signal to P1 when the register is empty and an "available" signal to P2 when it has data. Transfer in the other direction would be similar, using another register.

A similar simple mechanism can be used with programmed I/O over general purpose I/O (GPIO) ports if fast transfer is not needed. Such a simple mechanism may also be used, for auxiliary control signaling, together with (in addition to) the DMA transfer alternatives described here.

If the execution units do not have DMA, and fast block transfer is needed, then the Channel needs to have more storage. This could be in the form of a shared random access memory, or a FIFO buffer in each direction.

In a preferred exemplary embodiment, the execution units have multi-channel DMA units with buffer memories, and DMA transfer can use an 8-bit I/O extension bus. Programmed I/O (input/output directly controlled by the microcode and thus not using DMA) can be done either over the I/O extension bus or through general purpose I/O (GPIO) ports. Here P1 can use programmed I/O to write or read data to/from the main memory of P2 through one of P2's DMA channels, and P2 can write or read data to/from the main memory of P1 through one of P1's DMA channels. In an asymmetric system only one of these paths may be needed, and one of the DMA units might then be eliminated.

Figure 5:
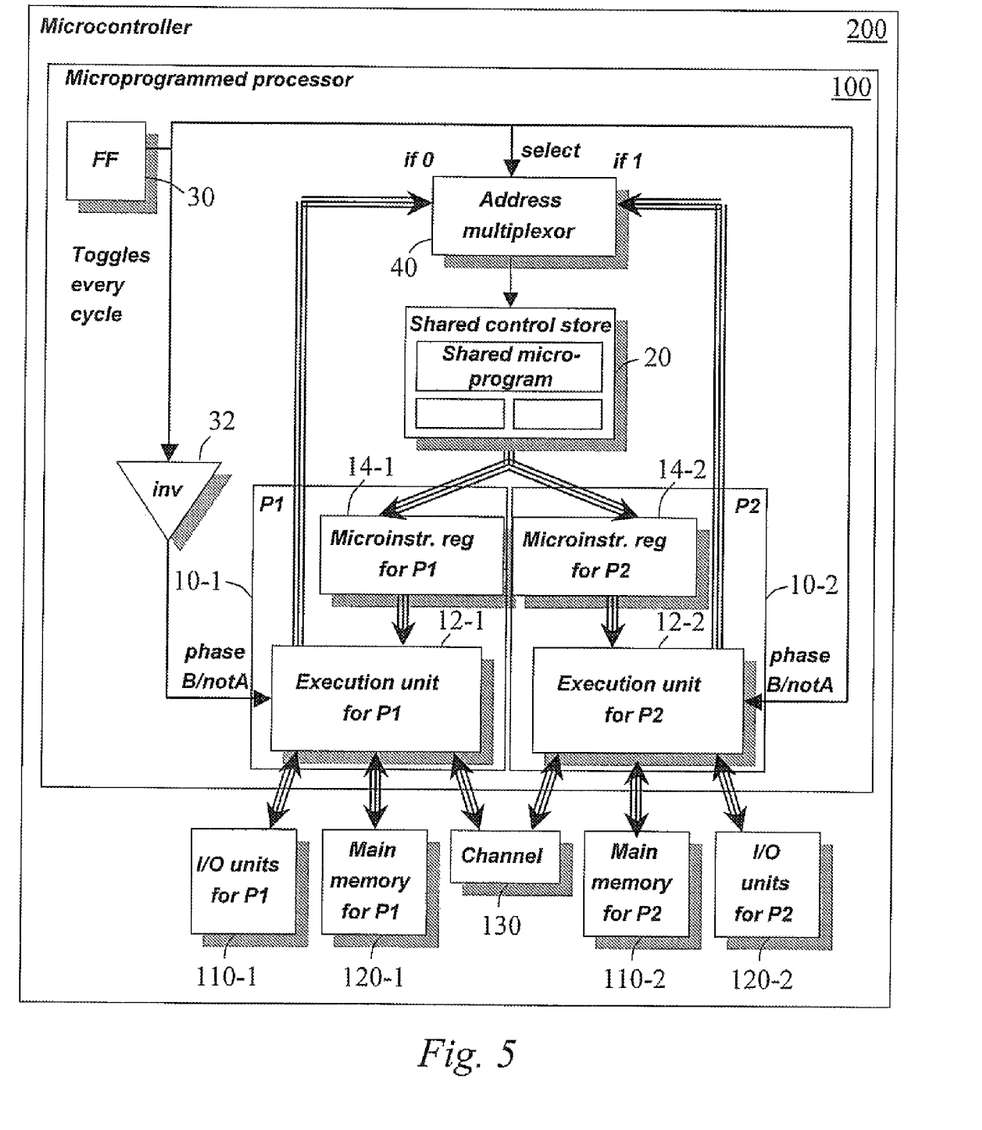
FIG. 5 is a schematic diagram illustrating a particular implementation example of a computer system of the present invention in the specific form of a microcontroller.

FIG. 5 is a schematic diagram illustrating a particular implementation example of a computer system of the present invention in the specific form of a microcontroller. In comparison to FIG. 4, it is here explicitly indicated which parts that preferably form part of the microprogrammed processor 100 and which parts (like memory and I/O units) that are located outside of the processor. In this particular embodiment, the processor 100 is also built as an integrated circuit (IC), and the I/O units and main memory 120 are preferably added on the same IC chip to form a microcontroller system 200. The microprogrammed multi-core processor 100 may then be referred to as the overall processor core of the microcontroller 200.

As previously indicated, the execution units 12 of the processor cores 10 may share portions of a microprogram in the control store 20, while further being used for executing different microprogram tasks independently of each other. In FIG. 5, it is illustrated that the control store 20 may include a shared microprogram or part thereof, especially for standard processor control operation, while also containing parts dedicated for other microprogram tasks.

Figure 6:
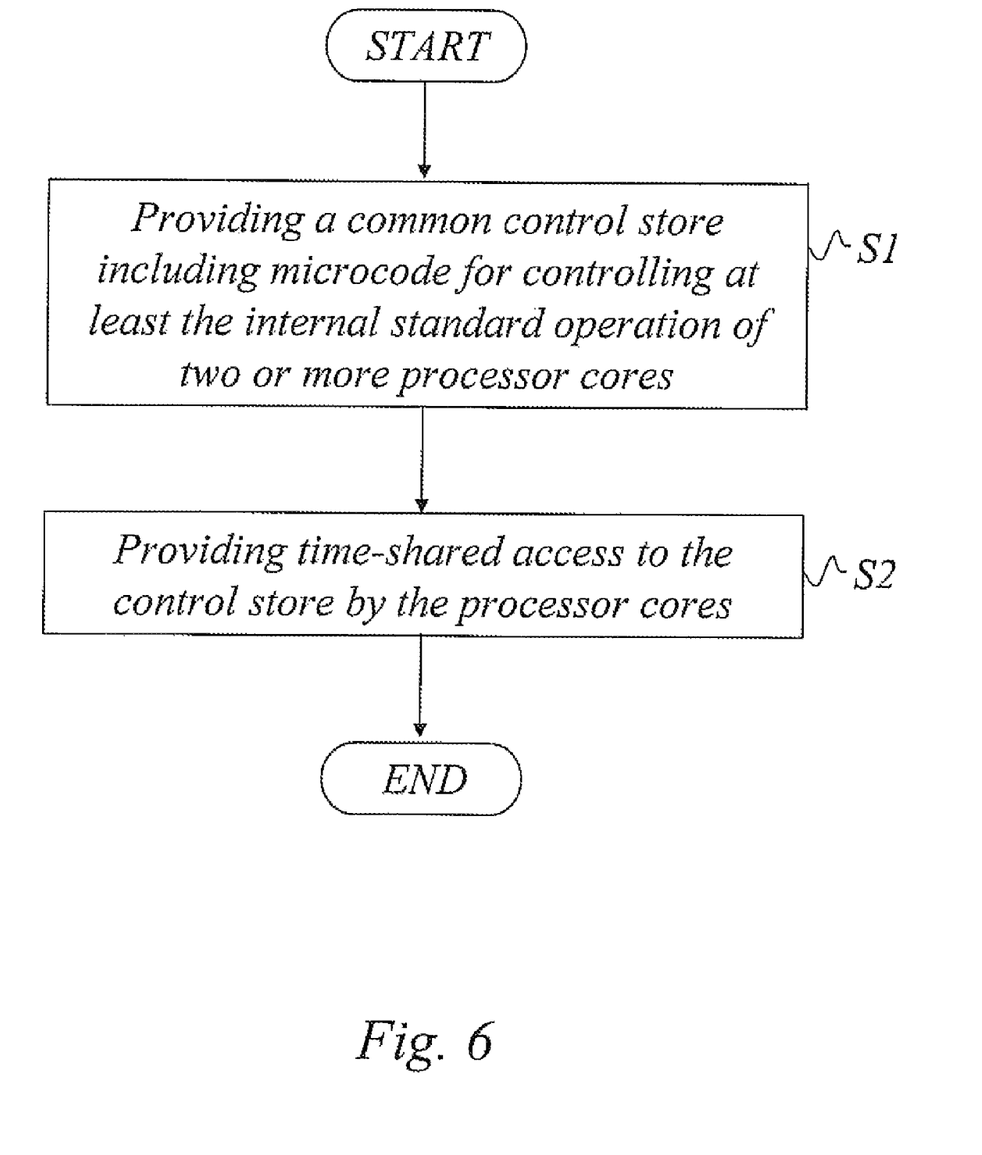
FIG. 6 is a schematic flow diagram illustrating a method of operating a microprogrammed processor according to an exemplary embodiment of the invention.

FIG. 6 is a schematic flow diagram illustrating a method of operating a microprogrammed processor according to an exemplary embodiment of the invention. In step S1, a common microprogram control store is provided, including microcode instructions for controlling at least the internal standard operation of the processor cores. In step S2, access to the common microprogram control store by the processor cores is provided on time-shared basis to enable the cores to execute microcode instructions independently of each other. Preferably, clock signals or equivalent control signals are generated for the processor cores such that the microinstruction cycles of the processor cores are executed out of phase.

The embodiments described above are merely given as examples, and it should be understood that the present invention is not limited thereto. Further modifications, changes and improvements which retain the basic underlying principles disclosed and claimed herein are within the scope of the invention.

The invention claimed is:

1. A microprogrammed multi-core processor, the microprogrammed processor being microcode controlled and comprising:
at least two processor cores, each of said processor cores having at least one internal execution unit and an associated microinstruction register;
a common internal microprogram control store connected to said microinstruction registers of said at least two processor cores, said common internal microprogram control store including microcode instructions for controlling at least the internal standard operation of said at least two processor cores, said microcode instructions controlling operation of said internal execution units;
means for providing time-shared access to said microprogram control store by said at least two processor cores,
wherein the microcode instructions from said common control store are loaded directly into said microinstruction registers of said at least two processor cores, contents of each of said microinstruction register directly controlling the associated said execution unit, thereby sharing resources of said control store of the microprogrammed processor, and
wherein said at least two processor cores are separate and configured to execute different microprogram tasks independently of each other according to respective execution threads, said execution unit of each of said at least two processor cores determining a next microprogram address.

2. The microprogrammed processor of claim 1, wherein the processor cores are configured for executing microcode instructions independently of each other.

3. The microprogrammed processor of claim 2, wherein each processor core is configured to first read a microcode instruction from the microprogram control store and then execute the microcode instruction, and while one of said processor cores executes a microcode instruction, another one of said processor core accesses the microprogram control store and reads another microcode instruction.

4. The microprogrammed processor of claim 1, wherein the execution units of said at least two processor cores and said common microprogram control store are provided on the same integrated circuit (IC) chip, effectively providing a microprogrammed multi-core microprocessor using the common microprogram control store.

5. The microprogrammed processor of claim 1, wherein the execution units of said at least two processor cores share portions of a microprogram in said common microprogram control store, while further being used for executing different microprogram tasks independently of each other.

6. The microprogrammed processor of claim 1, wherein said means for providing time-shared access comprises means for generating clock signals for said at least two cores to execute microinstruction cycles of the processor cores out of phase.

7. The microprogrammed processor of claim 6, wherein said processor cores includes two processor cores and each of the cores starts its microinstruction cycle when the other of the two cores is halfway through its cycle.

8. A computer system comprising a microprogrammed processor of claim 1.

9. The microprogrammed processor of claim 1, wherein each of said at least two processor cores is configured to fetch and execute machine instructions.

10. The microprogrammed processor of claim 9, wherein each of said at least two processor cores is connected to its own respective dedicated main memory.

11. A method of operating a microprogrammed multi-core processor that is microcode controlled and having at least two processor cores, each of said processor cores having at least one internal execution unit and an associated microinstruction register, said method comprising the steps of:

providing a common microprogram control store connected to the microinstruction registers of the at least two processor cores, said common microprogram control store including microcode instructions for controlling at least the internal standard operation of said at least two processor cores, said microcode instructions controlling operation of said internal execution units;

providing access to said common microprogram control store by said at least two processor cores on time-shared basis,     wherein the microcode instructions from said common control store are loaded directly into said microinstruction registers of said processor cores, contents of each of said microinstruction register directly controlling the associated said execution unit, thereby sharing resources of said control store of the microprogrammed processor; and     configuring the at least two processor cores, which are separate, to execute different microprogram tasks independently of each other according to respective execution threads, the execution unit of each of the at least two processor cores determining a next microprogram address.

12. The method of claim 11, wherein said step of providing access comprises the step of generating clock signals for said at least two processor cores to execute microinstruction cycles of the processor cores out of phase.

* * * * *